(12) United States Patent
Okunaga et al.

(10) Patent No.: US 6,445,549 B1
(45) Date of Patent: Sep. 3, 2002

(54) MAGNETIC DISK DRIVE

(75) Inventors: Nobuyuki Okunaga; Toshihisa Okazaki, both of Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/983,117

(22) Filed: Oct. 23, 2001

Related U.S. Application Data

(63) Continuation of application No. 09/422,242, filed on Oct. 21, 1999.

(30) Foreign Application Priority Data

Oct. 22, 1998 (JP) .......................................... 10-301028

(51) Int. Cl.[7] .............................................. G11B 5/55
(52) U.S. Cl. ................................................. 360/264.8
(58) Field of Search ........................... 360/264.8, 264.7

(56) References Cited

U.S. PATENT DOCUMENTS

| | | |
|---|---|---|
| 5,486,965 A | 1/1996 | Yoshida et al. |
| 5,914,836 A | 6/1999 | Pottebaum |

FOREIGN PATENT DOCUMENTS

| | | |
|---|---|---|
| JP | 64-39685 | 2/1989 |
| JP | 1-137476 | 5/1989 |

*Primary Examiner*—Robert S. Tupper
(74) *Attorney, Agent, or Firm*—Mattingly, Stanger & Malur, P.C.

(57) ABSTRACT

There is disclosed a support structure for a magnet-yoke assembly which prevents the magnet-yoke assembly, when vibrated on receipt of the driving reaction of a carriage, from causing a magnetic head and a magnetic disk to vibrate and which is independent of temperature. In a magnetic disk drive having a magnetic circuit which gives a driving force to a carriage 7 holding a magnetic head so as to position the magnetic head, the magnetic circuit comprises a driving coil 9 attached fixedly to the carriage and a magnet-yoke assembly 8, and the magnet-yoke assembly 8 is supported in a housing at one point thereof so as to be able to rotate in the direction parallel to the surface of the magnetic disk. The assembly is rotatably supported by means of a bearing 14 and the bearing is given with an initial displacement so as to increase the axial bearing rigidity thereof. A base 10 is provided with a slip guide 16 which allows the magnet-yoke assembly 8 to rotate with low friction and serves to give the initial displacement to the bearing. A visco-elastic member 17 is provided for restricting the rotation of the assembly.

3 Claims, 5 Drawing Sheets

MAGNETIC DISK DRIVE

This is a continuation application of U.S. Ser. No. 09/422,242, filed Oct. 21, 1999.

FIELD OF THE INVENTION

This invention relates to a magnetic disk drive and more particularly to a magnetic disk drive in which a magnetic circuit for driving a carriage is supported and which is capable of improving the accuracy with which a magnetic head for recording and reading information is moved and positioned at a predetermined point of a magnetic disk as magnetic recording medium.

BACKGROUND OF THE INVENTION

A magnetic disk drive, as soon as it is required to write and read on a magnetic disk, has to rapidly move a magnetic head in the radial direction of the magnetic disk so as to position it over the specified track. Therefore, for high-density recording and highspeed data processing, it is effective to reduce errors in positioning of the magnetic head and to store the data at narrower track pitch.

As for a magnetic circuit used as a driving means for positioning the magnetic head over the desired track of the magnetic disk, a voice coil motor (referred to as "VCM", hereinafter) is generally used which comprises a driving coil, permanent magnet, and yoke. The driving coil is fixed to a carriage, and the magnet and yoke (referred to as "magnet-yoke assembly", hereinafter) are fixed on a housing. It has been general to support the magnet-yoke assembly by fixing it directly to the housing with a plurality of screws.

However, when the driving coil fixed to the carriage is applied with electric current to generate a driving force, the resultant reaction is exerted on the magnet-yoke assembly to cause the housing to vibrate through the screws. Due to this vibrating force, the means for rotating the magnetic disk is vibrated and hence the magnetic disk is vibrated. As a consequence, relative displacement takes place between the magnetic head supported by the carriage and the magnetic disk at the time of positioning, and therefore it is necessary to reduce the structural vibration attributed to the driving reaction of the VCM in order to achieve high-speed and high-precision positioning.

As means for solving the above problems, there is known a technology disclosed in JP-A-1-137476, for example. In this example, the magnet-yoke assembly is fixed to the housing through an antivibration member at its lower surface, and therefore the vibration of the VCM caused by the movement of the carriage is restrained from being transmitted to the housing.

Further, as means for reducing the vibration of the rotating means on which the magnetic disk is set, there is known a technology disclosed in JP-A-64-39685, for example. In this example, the magnet-yoke assembly is supported in the housing through a damper at its upper and lower surfaces and an elastic member at its side surfaces, and therefore it is possible to reduce the transmission of reaction to the magnetic disk even if the frequency of the vibration of the VCM caused by the driving reaction agrees with that of the damped vibration of the rotating means.

However, in the conventional technology disclosed in JP-A-1-137476, the vibration of the magnet-yoke assembly caused due to the driving reaction of the carriage can be damped, but the direction of motion of the magnet-yoke assembly is not controlled. When the apparatus is applied with external force such as vibration, impact and so on, the magnet-yoke assembly is vibrated not only in the oscillating direction but also in the axial direction of the carriage to cause relative displacement to take place between the permanent magnet and the driving coil in the direction of gap, with the result that it is difficult to keep the gap between them constant.

Therefore, there is a danger that the permanent magnet and the driving coil are brought into contact with each other, giving rise to a problem that the size, particularly the thickness of the permanent magnet cannot be made large enough to obtain the carriage driving force sufficiently. To solve this problem, it is necessary to increase the thickness of the apparatus, which makes it difficult to be thinner.

On the other hand, in the conventional technology disclosed in JP-A-64-39685, the magnet-yoke assembly is supported and fixed in the hung state through the damper of rubber member and the elastic member of leaf spring, thus providing an antivibration structure. The rubber member and the leaf spring are of the shapes that allow for reduction in peak of the resonance of a spindle support system on which the magnetic disk is set. When the magnet-yoke assembly is supported through the rubber member, since the rubber member changes greatly in its own rigidity and damping characteristics with temperature, the antivibration structure of the support system can show only a small effect according to the kind and arrangement conditions of rubber member and the environmental conditions of the apparatus, giving rise to a problem that the effect of making the reduction in resonance of the spindle support system reach the target is not always shown satisfactorily.

An object of the present invention is to provide a magnetic disk drive which overcomes the above problems of the prior arts and in which a magnetic circuit is supported effectively in order to improve the accuracy of positioning a magnetic head.

SUMMARY OF THE INVENTION

It is possible to efficiently damp the vibration of a magnet-yoke assembly, provided that the driving reaction allows the magnet-yoke assembly to move only in the oscillating direction of a driving coil. In order to solve the above problems, the present invention mainly adopts the following constructions.

There is provided a magnetic disk drive comprising a plurality of magnetic disks as magnetic recording medium, a rotating means for rotating the magnetic disk, a carriage holding a magnetic head for recording and reading information on the magnetic disk, a magnetic circuit for giving a driving force to the carriage so as to position the magnetic head at an arbitrary point in the radial direction of the magnetic disk, and a housing including a base and a cover, wherein the magnetic circuit comprises a driving coil attached fixedly to the carriage and a magnet-yoke assembly in which magnet and yoke are integrated, and the magnet-yoke assembly is supported in the housing at one point thereof so as to be able to rotate in the direction parallel to the surface of the magnetic disk.

Preferably, the magnet-yoke assembly is rotatably supported by means of a bearing, and the bearing is given with an initial displacement to increase the axial bearing rigidity thereof.

Further, it is preferred that the base or the cover is provided with a slip guide so as to rotate the magnet-yoke assembly on the slip guide surface with low friction and give an initial displacement to the bearing.

DESCRIPTION OF THE PREFERRED EMBODIMENTS

Figure 1:
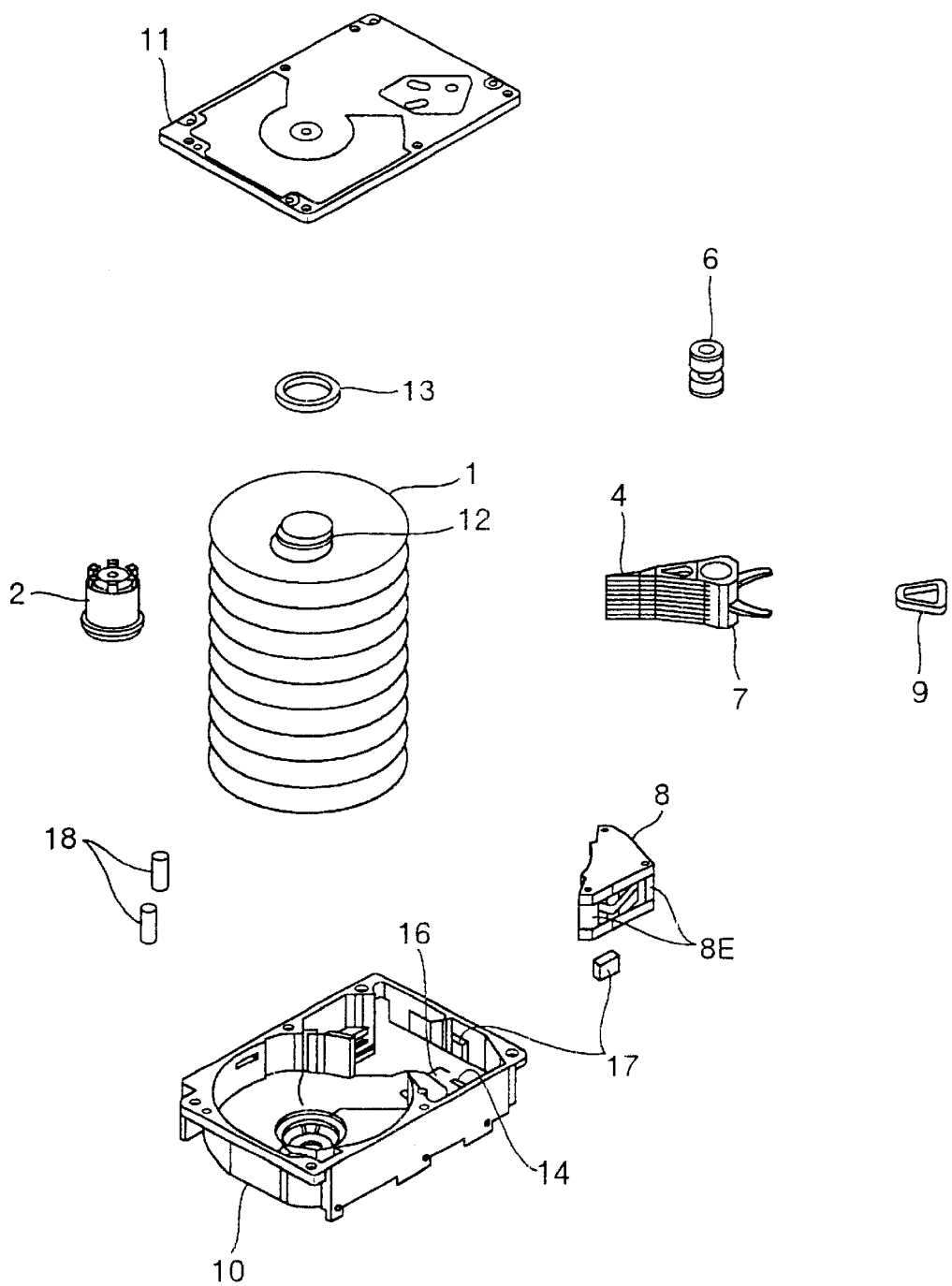
FIG. 1 is an exploded perspective view showing an example of essential portions of a magnetic disk drive according to an embodiment of the present invention.
Figure 2:
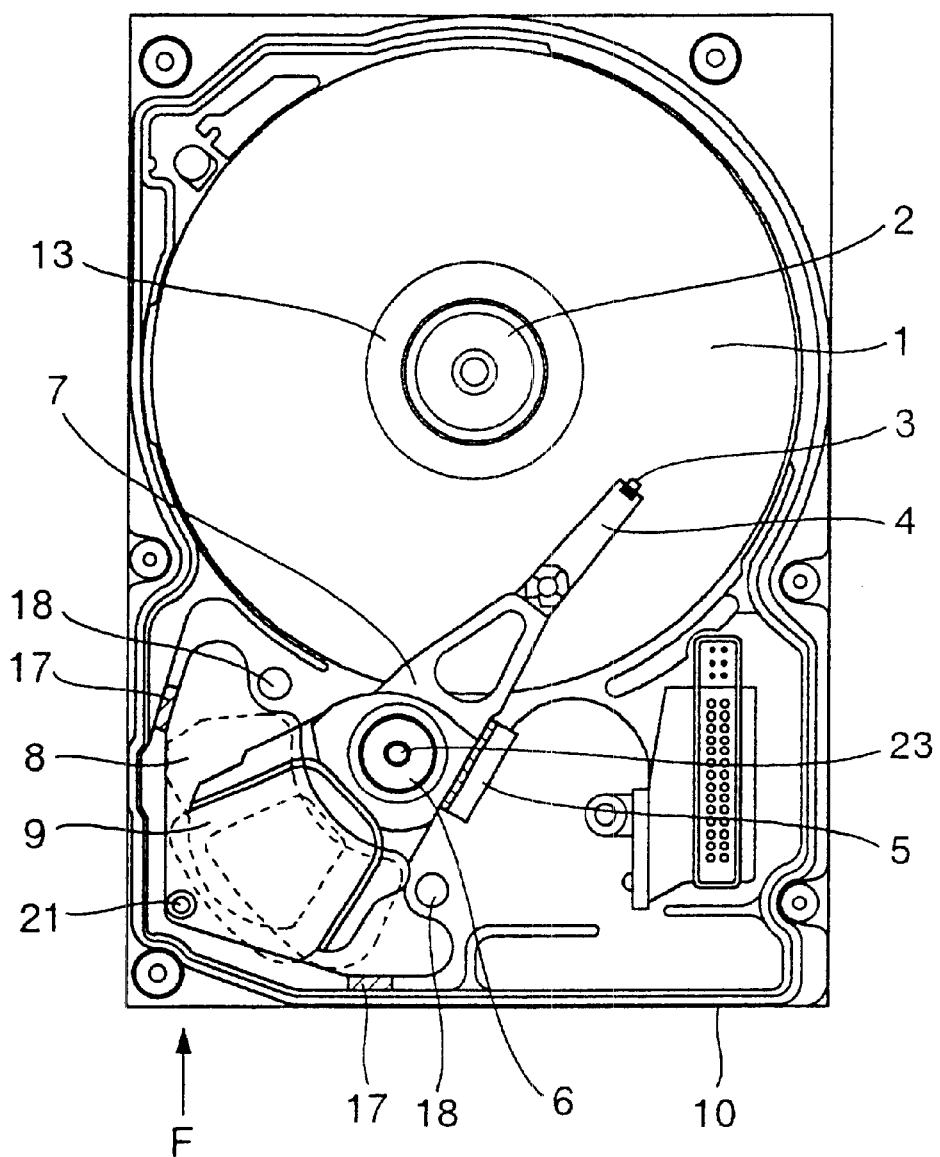
FIG. 2 is a plan view showing the interior structure of the magnetic disk drive in the assembled state.
Figure 3:
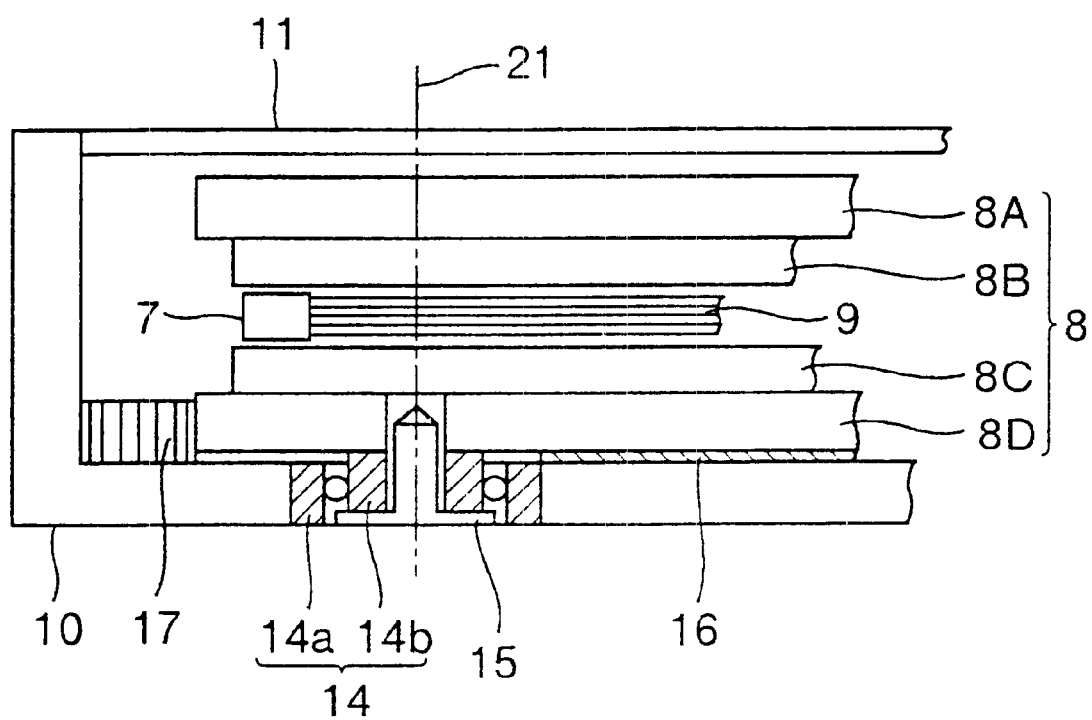
FIG. 3 is a sectional view of FIG. 2 as viewed from the direction shown by the arrow F.

Description will be given below of the magnetic disk drive according to the present invention with reference to the drawings. FIGS. 1, 2 and 3 illustrate a magnetic disk drive according to a first embodiment of the invention. FIG. 1 is an exploded perspective view showing an example of essential portions of the magnetic disk drive according to an embodiment of the invention, FIG. 2 shows the interior structure thereof in the assembled state, and FIG. 3 is a sectional view of FIG. 2 as viewed from the direction shown by the arrow F.

In a base 10 are set magnetic disks 1 on which position control information and data can be stored, a spindle motor 2 for rotating the magnetic disk 1 at a predetermined speed, a head assembly 4 including a magnetic head 3 and a circuit unit 5 for signal transmission by means of which read and write of the position control information and data are carried out, a carriage 7 for positioning the magnetic head through a pivot bearing 6, and a voice coil motor for driving the carriage 7. Ten magnetic disks 1 are stacked in the axial direction with disk spacers 12 put between them and fixed on the spindle motor 2 by means of a disk clamp 13.

As shown in FIGS. 1 and 3, a magnet-yoke assembly 8 comprises an upper yoke 8A having an upper magnet 8B adhered thereto and a lower yoke 8D having a lower magnet 8C adhered thereto which are integrated with a fixed distance left between them through the medium of spacers 8E (omitted in FIG. 3). The carriage driving force is obtained by the fact that, when a coil 9 attached to the carriage 7 is arranged between the upper and lower magnets 8B, 8C (in an air gap in a magnetic circuit) and then applied with electric current, a Lorentz force is generated due to the electric current flowing perpendicularly to the sheet plane of FIG. 3 and the magnetic flux in the air gap and as a consequence the coil 9 receives a thrust exerted in the right-and-left direction of the sheet plane.

When a driving force is applied to the coil 9, another force, which is of equal magnitude and acts in the opposite direction, is applied to the magnet-yoke assembly as well, as a reaction thereto. In the conventional apparatus, the magnet-yoke assembly is fixed directly on the base with a plurality of screws and so on, and therefore this force is transmitted through the base to the pivot bearing and the spindle and as a consequence the magnetic head and the magnetic disk fixed thereon, respectively, are vibrated to cause relative displacement take place between the head and the disk, thereby deteriorating the accuracy of positioning.

In this embodiment, the magnet-yoke assembly 8 is supported on the base 10 through a ball bearing 14 used as an example of rotatable member 14, and therefore the assembly 8 is rotatably supported about a rotary shaft 21 of the magnet-yoke assembly independently of the carriage 7 which holds the driving coil 9 and rotates about a rotary shaft 23 of the carriage. Further, the magnet-yoke assembly is engaged with visco-elastic members 17 at the side surfaces thereof.

Consequently, when the electric current is applied to the coil 9 and the carriage 7 is rotated, the resultant reaction causes the magnet-yoke assembly to rotate about the rotary shaft 21 in the opposite direction to consume the vibration energy, and the rotational displacement of the magnet-yoke assembly is restricted by the visco-elastic members 17. The rotary shaft 21 allows the magnet-yoke assembly to rotate positively, while the visco-elastic members 17 restrict any further rotation of the assembly after the assembly have been rotated to come in contact therewith. This makes it possible to reduce the transmission of the reaction to the base 10 resulting from the motion of the carriage 7.

The method of rotatably supporting the magnet-yoke assembly will be described with reference to FIG. 3. In this embodiment, an outer ring 14a of the ball bearing 14 is fixed by bonding to the base 10, and a slip guide 16 made of resin as an example of low friction coefficient member is adhered onto the base 10, and the lower yoke 8D is arranged on the slip guide 16 so as to be brought into contact therewith. The slip guide 16 is not a visco-elastic member but a member by which the yoke 8D is allowed to slide easily. The lower yoke 8D and an inner ring 14b of the bearing 14 are fixed with a screw 15 so that they are brought into contact with each other. The position of the bearing 14 is not limited to a point 21 in FIG. 2, and another bearing 14 may be additionally provided on a cover 11 in the same way as well, if possible.

It should be noted that the slip guide 16 doesn't necessarily have to support the position of the center of gravity of the magnet-yoke assembly 8. As shown in FIG. 2, the rotary shaft 21 of the assembly 8 is not located at the position of the center of gravity of the assembly but in the vicinity of one end portion of the assembly 8. Therefore, due to the provision of the slip guide 16, it is possible to stably mount the assembly 8 in such a manner that the assembly 8 is not applied with bending or twisting force in the axial direction (in the top-and-bottom direction of the sheet plane of FIG. 3). As shown in FIG. 3, since the rotary shaft 21 is located in the vicinity of one end portion of the assembly 8, the vicinity of the other end portion thereof on the opposite side is an free end and hence easily applied with bending or twisting force, and however this free end can be held by the slip guide 16. Further, by making a little difference in surface level between the outer and inner rings 14a and 14b of the bearing 14, the sliding performance of the lower yoke 8D can be improved, because the lower yoke 8D comes to avoid interfering with the upper end of the outer ring 14a.

Moreover, the provision of the slip guide 16 has the effect of giving an initial displacement to the bearing 14, and it becomes possible to increase the bearing rigidity for the magnet-yoke assembly. Namely, in FIG. 3, as the screw 15 is tightened into the lower yoke 8D from a condition in which the lower surface of the lower yoke 8D is in contact with the slip guide 16 under the weight of the yoke 8, the inner ring 14b is moved up relative to the outer ring 14a fixed to the base 10 until the upper end of the inner ring 14b is brought into contact with the lower surface of the lower yoke 8D, in which state the yoke 8, inner ring 14b and screw 15 are integrated. It should be noted that the inner ring 14b is displaced upward to the extend that there is no play for the balls between the inner and outer ball races, this upward displacement corresponding to what is called the initial displacement of the bearing. In other words, the thickness of the slip guide 16 is equivalent to the initial displacement of the bearing, and therefore there can be no play in the bearing and hence the bearing rigidity for the magnet-yoke assembly is increased.

In the conventional apparatus in which the magnet-yoke assembly is held by the visco-elastic members, shapes and sizes and materials of the visco-elastic members were decided so that the natural frequency, which depends on the weight of the magnet-yoke assembly, the rigidity of the support system, and the weights and bearing rigidities of the carriage and the bearing for supporting the carriage, is shifted into the range in which the carriage control servo-mechanism can work. This led to the effect that it is possible to lower the peak of the resonance of the magnet-yoke assembly, carriage and support system therefor and that it is possible to improve the stability of the positioning control system to increase the accuracy of positioning.

However, it was confirmed that the visco-elastic member was reduced in hardness under high temperature conditions, and accordingly it has been the problem to provide the structure in which the bearing rigidity for the magnet-yoke assembly is unchanged.

In the aforesaid structure according to the first embodiment of the invention, there is caused no rigidity reduction due to the temperature conditions and it is possible to freely change the size and initial displacement of the bearing 14, and therefore it becomes possible to calculate and design easily in the same way as the carriage vibration system, with the result that the occurrence of residual vibration at and around the magnetic head 3 is suppressed and hence the time required for the head to move from track to track is shortened, thereby making sure of high-speed transfer.

Figure 4:
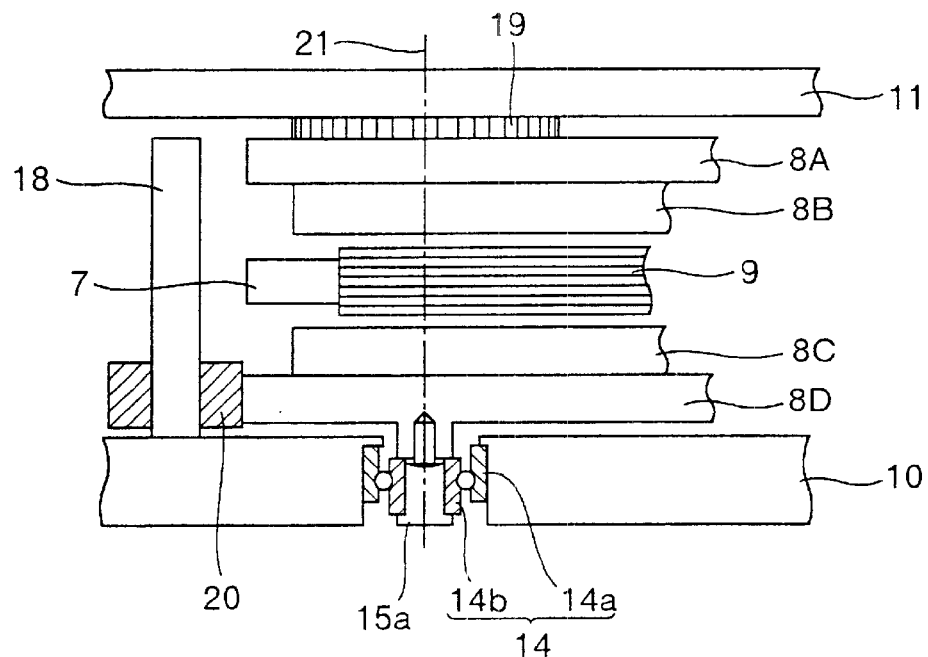
FIG. 4 is a view illustrating a support structure for the magnet-yoke assembly of the magnetic disk drive according to a second embodiment of the invention.

FIG. 4 is a view illustrating a support structure for the magnet-yoke assembly of the magnetic disk drive according to a second embodiment of the invention. In FIG. 4, reference numeral 18 denotes stoppers by which the carriage 7, when oscillated, is prevented from moving beyond the prescribed range.

In the embodiment shown in FIG. 4, the lower yoke 8D is formed with a projection which is brought into contact with the inner ring 14b of the bearing 14, and a slip guide 19 is arranged between the upper yoke 8A and the cover 11. The screw 15 is screwed into the yoke 8D so that the screw 15, inner ring 14b and lower yoke 8D are integrated and then, by mounting the cover 11, the yoke is applied with pressing force from above through the slip guide 19 so as to give an initial displacement to the bearing 14 as shown in FIG. 4. The thickness of the slip guide 19 corresponds to the initial displacement of the bearing 14.

In this embodiment, the magnet-yoke assembly is rotatably supported about the rotary shaft 21 in the same manner as the aforesaid first embodiment, but the bearing 14 is given with the initial displacement in the opposite direction. Further, visco-elastic members 20 arranged at the sides of the magnet-yoke assembly are fixed to the stoppers 18. The visco-elastic members 20 are engaged with the lower yoke 8D in FIG. 4 but they may be engaged with the upper yoke 8A or the magnet 8B, 8C.

Figure 5:
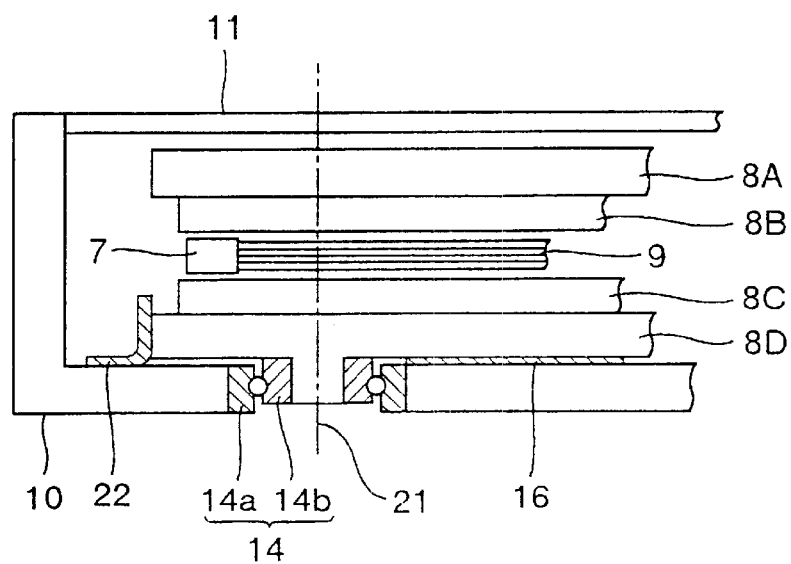
FIG. 5 is a view illustrating a support structure for the magnet-yoke assembly of the magnetic disk drive according to a third embodiment of the invention.

FIG. 5 is a view illustrating a support structure for the magnet-yoke assembly of the magnetic disk drive according to a third embodiment of the invention. In this embodiment, the lower yoke 8D is fixed by bonding or press fit to the inner ring 14b of the bearing 14, so that the magnet-yoke assembly is supported on the base 10 with no screws. Elastic members 22 of leaf spring are provided on the base so as to face the side surfaces of the magnet-yoke assembly and engaged with the lower yoke 8D. In FIG. 5, the slip guide 16 has the effect of giving an initial displacement to the bearing 14 due to its thickness and allowing the lower yoke 8D to rotate easily.

The effects achieved by the second and third embodiments are the same as those achieved by the first embodiment, and it is possible for each embodiment to improve the accuracy of positioning the magnetic head by changing the combination according to the mounting space and cost.

Figure 6:
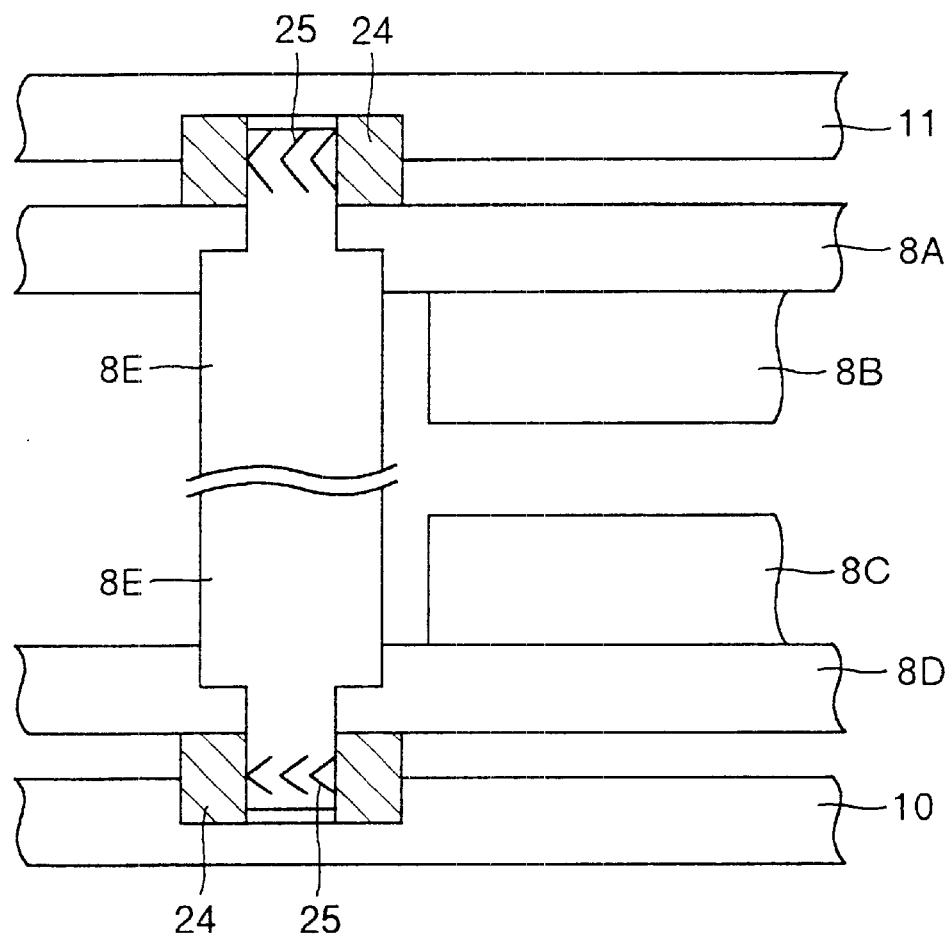
FIG. 6 is a view illustrating a support structure for the magnet-yoke assembly of the magnetic disk drive according to a fourth embodiment of the invention.

FIG. 6 is a sectional view illustrating a support structure for the magnet-yoke assembly of the magnetic disk drive according to a fourth embodiment of the invention. In this embodiment, plain bearings 24 are arranged in two upper and lower positions, and the spacer 8E of the magnet-yoke assembly is provided with grooves 25. It is advisable that the plain bearings are made of inexpensive resin alone such as polytetrafluoroethylene and so on, but it is possible to use the parts for the dynamic pressure bearing as well in case that faster seek causes the driving reaction to be larger and a further reduction in vibration of the magnet-yoke assembly is required. According to this embodiment the spacer 8E of the magnet-yoke assembly (see FIG. 1) also serves as a rotary shaft of the assembly, and moreover the plain bearings 24 contribute the sliding function to the assembly 8.

As described above, the embodiments of the present invention can achieve the following constructions, effects and functions.

In the magnetic disk drive according to the present invention, the assembly of permanent magnet and yoke is supported in a housing through the medium of ball or plain bearing so as to be able to rotate only in the oscillating direction of the carriage. With such structure, it is possible to consume the vibration energy of the magnet-yoke assembly without depending on the visco-elastic members, and the vibration of VCM caused due to the movement of the carriage can be restrained from being transmitted to the housing.

Further, the slip guide as low friction coefficient member is arranged between the housing and the magnet-yoke assembly, and therefore it becomes possible to improve the bearing rigidity in the axial direction by giving the initial displacement to the bearing and, even if the magnet-yoke assembly is supported at one point other than the position of the center of gravity thereof, no rotation moment is applied in the axial direction, with the result that it becomes possible to mount the assembly while reducing the relative displacement between the permanent magnet and driving coil in the direction of gap.

Moreover, in the magnetic disk drive according to the present invention, the visco-elastic members made of rubber or resin or the elastic members made of leaf spring are so arranged as to face the side surfaces of the magnet-yoke assembly, and therefore the rotational displacement of the magnet-yoke assembly is restricted and the occurrence of thrust fluctuation is suppressed.

As has been described above, according to the present invention, it is possible to suppress the deterioration of the accuracy of positioning the magnetic head caused due to the reaction exerted on the magnet-yoke assembly when the coil for driving the magnetic head is driven.

Further, even when the temperature of the magnetic disk drive is changed due to the apparatus environment, it is possible to position the magnetic head with accuracy, and therefore it is possible to provide a high-speed and large-capacity magnetic disk drive.

Having described preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A magnetic disk drive, comprising:

a magnetic disk;

a spindle motor for rotating said magnetic disk;

a magnetic head for recording and reading information on said magnetic disk;

a carriage which holds said magnetic head and a driving coil;

a magnetic circuit having a magnet and a yoke and used for driving said carriage; and a housing including a base and a cover;

wherein said yoke is rotatably supported in said housing at one point that is different from a point at which said carriage is rotatably supported in a plan view, by means of a bearing, whereby the axis of rotation of said yoke is different from the axis of rotation of said carriage.

2. The magnetic disk drive according to claim 1, wherein said bearing is provided with an initial displacement to increase the axial bearing rigidity of the bearing.

3. The magnetic disk drive according to claim 2, wherein in a visco-elastic member is arranged so as to face the side of said yoke and is arranged so as to restrict the rotation of said yoke.

* * * * *